United States Patent
Uchiyama et al.

(10) Patent No.: US 8,115,820 B2
(45) Date of Patent: Feb. 14, 2012

(54) IMAGE PROCESSING APPARATUS AND IMAGE PROCESSING METHOD

(75) Inventors: Shinzo Uchiyama, Utsunomiya (JP); Yasuhiro Sawada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 12/268,661

(22) Filed: Nov. 11, 2008

(65) Prior Publication Data
US 2009/0128703 A1 May 21, 2009

(30) Foreign Application Priority Data
Nov. 16, 2007 (JP) .................................. 2007-298281

(51) Int. Cl.
*H04N 5/228* (2006.01)
(52) U.S. Cl. .................................................... 348/222.1
(58) Field of Classification Search ............... 348/222.1, 348/223.1, 241, 231.99, 231.3, 231.6
See application file for complete search history.

(56) References Cited

U.S. PATENT DOCUMENTS
6,724,702 B2    4/2004  Taguchi et al.
7,515,747 B2 *  4/2009  Okutomi et al. .............. 382/167

FOREIGN PATENT DOCUMENTS
JP   2001-145117 A   5/2001
JP   2003-018407 A   1/2003
JP   2006-135744 A   5/2006

* cited by examiner

*Primary Examiner* — Hung Dang
(74) *Attorney, Agent, or Firm* — Canon USA Inc. IP Division

(57) ABSTRACT

An image processing apparatus configured to perform a process to reduce a color blur in a color motion picture image utilizing a first frame image and a second frame image that has been obtained after the first frame image includes a memory configured to store a first color blur reduction amount used for the process to the first frame image, an estimator configured to calculate a color blur estimation amount in the second frame image through a spatial operation to the second frame image, and a determination part configured to calculate a second color blur reduction amount used for the process to the second frame image so that a difference between the first color blur reduction amount and the color blur estimation amount can fall within a predetermined range.

6 Claims, 16 Drawing Sheets

PRIOR ART

IMAGE PROCESSING APPARATUS AND IMAGE PROCESSING METHOD

BACKGROUND OF THE INVENTION

1. Field of the Invention

The present invention relates to a method of operating an image obtained by a color image pickup apparatus, such as a film camera, a digital camera and a video camera, into a proper image, and a program and apparatus used for the method. The present invention relates more particularly to image processing that makes inconspicuous an originally nonexistent blur color distribution around a bright image.

2. Description of the Related Art

A color image pickup system generates originally nonexistent artifacts in blue, in red, and in purple as a blend of blue and red in a blur shape, around a bright part on an image due to a chromatic aberration of an imaging optical system. This blur is referred to as a color blur or a purple fringe.

A combination of plural lenses having different dispersions can optically reduce the chromatic aberration to some extent. However, as a small size of a digital camera progresses, high resolution image sensors (or image pickup devices) and smaller optical systems are increasingly demanded, and it is difficult to sufficiently reduce the chromatic aberration only by the optics. Therefore, the image processing is required to reduce an artifact.

The chromatic aberration is roughly classified into a lateral chromatic aberration (chromatic aberration of magnification) and a longitudinal (or axial) chromatic aberration. When the light emitted from a light source 10 images on a focal plane 12 via an imaging optical system 11, as shown in FIG. 1, the lateral chromatic aberration appears as shifts of imaging positions of a B ray 13 having a wavelength of about 450 nm, a G ray 14 having a wavelength of about 550 nm, and a R ray 15 having a wavelength of about 650 nm in the image surface direction. On the other hand, when the light emitted from a light source 20 images on a focal plane 22 via an imaging optical system 21, as shown in FIG. 2, the longitudinal chromatic aberration appears as shifts of imaging positions of the RBG rays 23-25 in the optical-axis direction.

As disclosed in U.S. Pat. No. 6,724,702, the lateral chromatic conversion of a digital imaging system of a primary color system can be corrected through a geometric conversion that applies a different deformation to each color plane of RGB.

On the other hand, the longitudinal chromatic aberration means, in an image that is focused with the G plane as a central wavelength of the visible light region, for example, that the image is out of focus with respect to the R and B planes that are ends of the visible light. This cannot be corrected by the geometric conversion although it is effective to the lateral chromatic aberration. The longitudinal chromatic aberration can be made inconspicuous by lowering the chroma of a color blur area as disclosed in Japanese Patent Laid-Open No. ("JP") 2001-145117, or can be corrected by applying a different contour emphasis process to each color plane of RGB as disclosed in JP 2003-018407.

In addition, a color blur reduction process is available even in the motion picture imaging, as disclosed in JP 2006-135744, for a color blur generating portion by searching for it using the previous motion picture image frame, and by specifying a target region in this motion picture image frame to some extent.

However, a chroma lowering process disclosed in JP 2001-145117 is a process that degrades a color of a high brightness pixel down to a brightness level of another color. This process is effective in reducing unnaturalness by erasing a color of the color blur, but the original colors of a subject can sometimes be also influenced and the image is likely grayish irrespective of the existence of the color blur.

The process disclosed in JP 2003-018407 utilizes a deconvolution and its approximate contour emphasis process, but has a problem of a difficulty in obtaining a precise aberration function necessary to obtain a proper result. It is difficult to precisely recognize an aberration function corresponding to each of huge imaging conditions that include a zoom position, a stop value, a focus position, a size of each lens, and an assembly state. In addition, the deconvolution can be used only in the linear reaction area of an image sensor, and cannot reduce a color blur around the saturation pixel.

When each of these prior art chromatic aberration reduction processes is applied to a motion picture image obtained by taking a moving high brightness subject, discontinuous processes of a time series of an application and a non-application of the chromatic aberration reduction process generate unnatural motion picture images, bringing a sense of discomfort to a viewer.

The color blur reduction process disclosed in JP 2006-135744 utilizes the previous motion picture image frame and reduces a calculation load, but does not have an effect of mitigating a sense of discomfort caused by the discontinuous color blur reduction processes.

SUMMARY OF THE INVENTION

The present invention is directed to an image processing apparatus and an image processing method which provide image processing that can effectively reduce a color blur that would otherwise appear around a bright part in an image due to a chromatic aberration of an imaging optical system, and that can reproduce original colors. The present invention is also directed to an image processing apparatus and an image processing method which can reduce unnaturalness generated by discontinuous color blur reduction processes between frame images in the motion pictures.

An image processing apparatus according to one aspect of the present invention configured to perform a process to reduce a color blur in a color motion picture image utilizing a first frame image and a second frame image that has been obtained after the first frame image includes a memory configured to store a first color blur reduction amount used for the process to the first frame image, an estimator configured to calculate a color blur estimation amount in the second frame image through a spatial operation to the second frame image, and a determination part configured to calculate a second color blur reduction amount used for the process to the second frame image so that a difference between the first color blur reduction amount and the color blur estimation amount can fall within a predetermined range.

An image processing apparatus according to another aspect of the present invention configured to perform a process to reduce a color blur in a color motion picture image utilizing a first frame image and a second frame image that has been obtained after the first frame image includes a memory configured to store a first pixel value used for the process to the first frame image, a first estimator configured to calculate a color blur estimation amount in the second frame image through a spatial operation to the second frame image, a second estimator configured to calculate an estimation pixel value obtained through the process by using the color blur estimation value to the second frame image, and a determination part configured to calculate a second pixel value output as a result of the process to the second frame image so that a difference between the first pixel value and the color blur estimation amount can fall within a predetermined range.

An image processing method according to another aspect of the present invention configured to perform a process to reduce a color blur in a color motion picture image utilizing a first frame image and a second frame image that has been obtained after the first frame image includes the steps of storing a first color blur reduction amount used for the process to the first frame image, calculating a color blur estimation amount in the second frame image through a spatial operation to the second frame image, and calculating a second color blur reduction amount used for the process to the second frame image so that a difference between the first color blur reduction amount and the color blur estimation amount can fall within a predetermined range.

An image processing method according to still another aspect of the present invention configured to perform a process to reduce a color blur in a color motion picture image utilizing a first frame image and a second frame image that has been obtained after the first frame image includes the steps of storing a first pixel value used for the process to the first frame image, calculating a color blur estimation amount in the second frame image through a spatial operation to the second frame image, calculating an estimation pixel value obtained through the process by using the color blur estimation value to the second frame image, and calculating a second pixel value output as a result of the process to the second frame image so that a difference between the first pixel value and the color blur estimation amount can fall within a predetermined range.

Further features of the present invention will become apparent from the following description of exemplary embodiments (with reference to the attached drawings).

DESCRIPTION OF THE EMBODIMENTS

Figure 1:
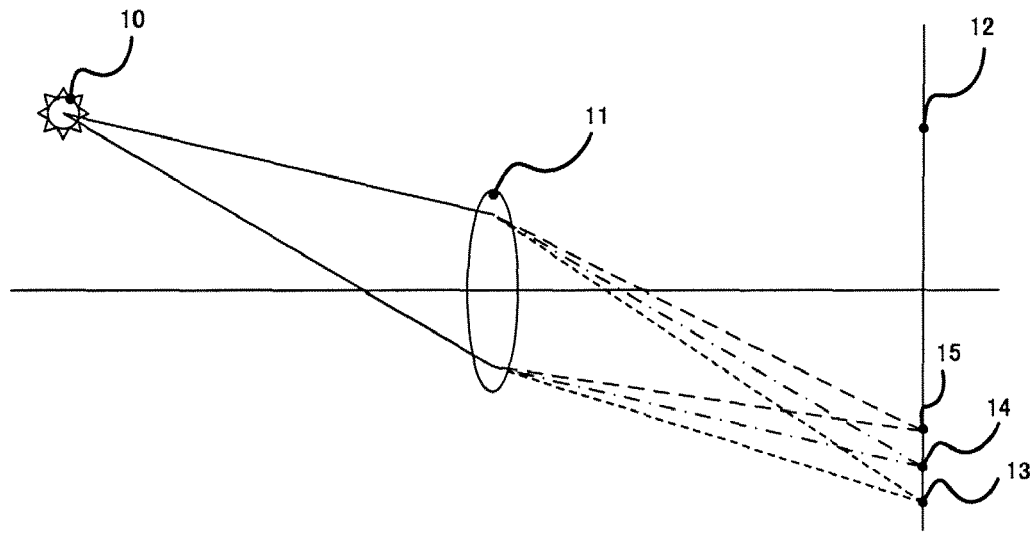
FIG. 1 is an explanatory view of the lateral chromatic aberration.
Figure 2:
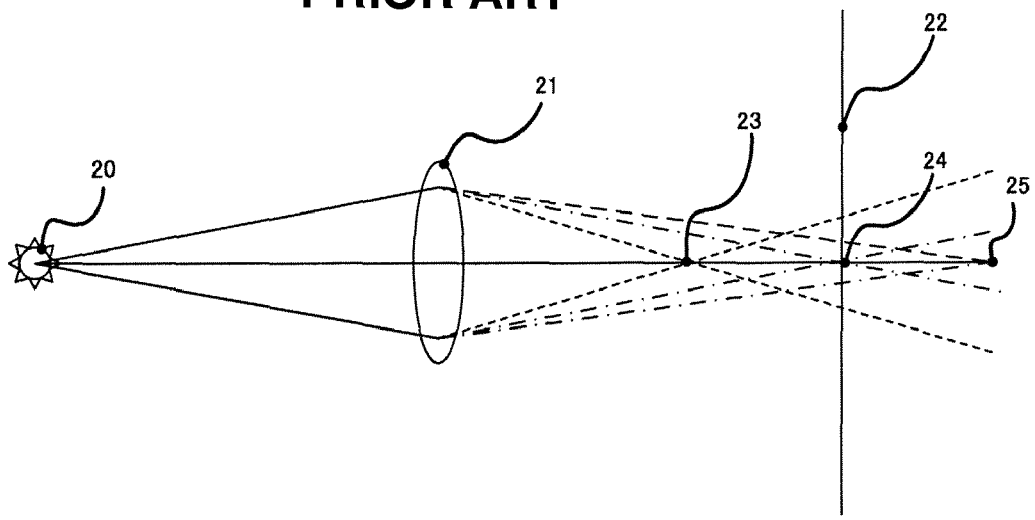
FIG. 2 is an explanatory view of the longitudinal chromatic aberration.

Referring now to the drawings, a description will be given of a preferred embodiment of the present invention.

First Embodiment

Figure 3:
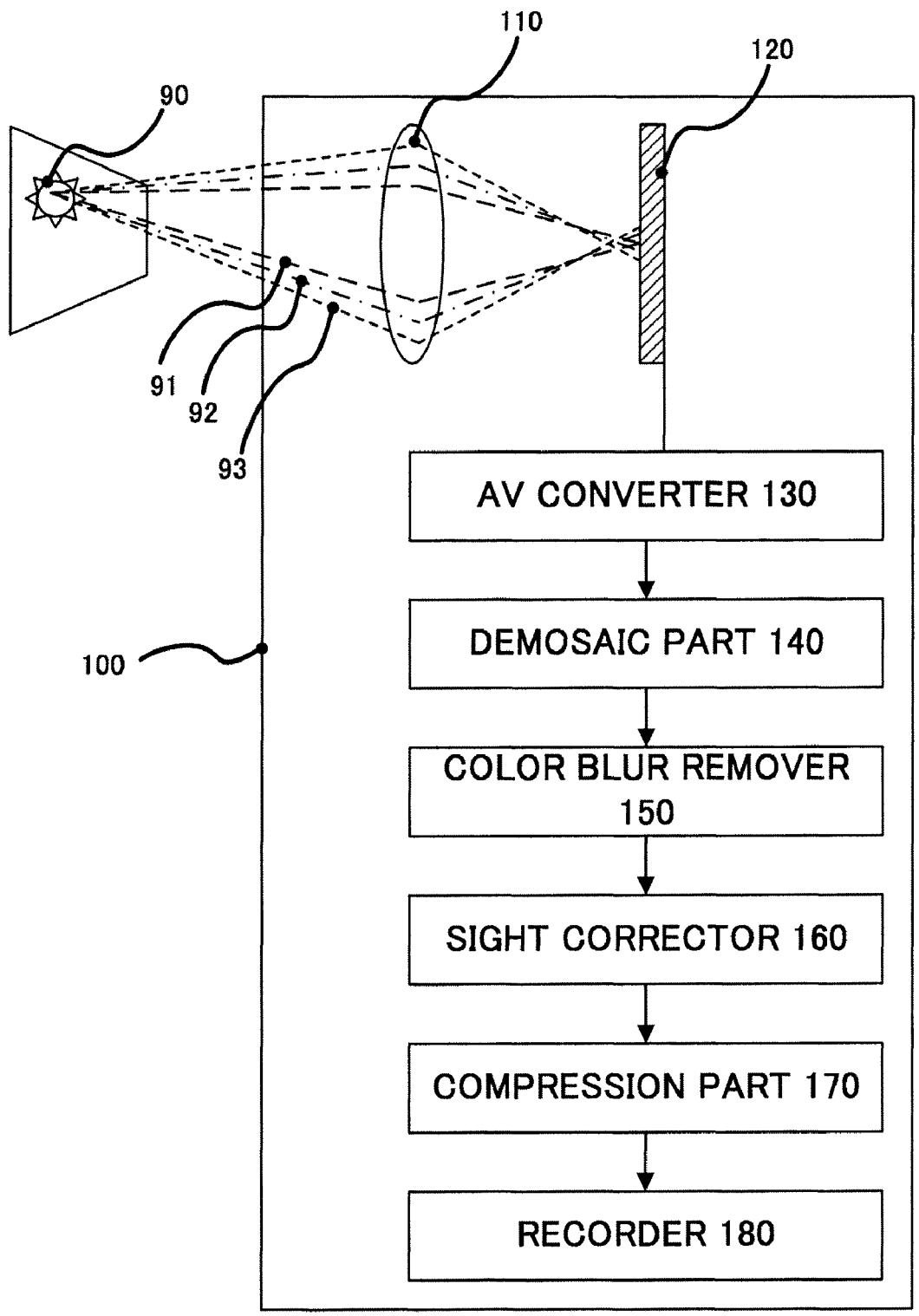
FIG. 3 is a block diagram showing a structure of a color image pickup apparatus according to a first embodiment of the present invention.

FIG. 3 shows a color image pickup apparatus 100 that utilizes an image processing method or is mounted with an image processing apparatus according to a first embodiment of the present invention.

The color image pickup apparatus 100 includes an imaging optical system 110, an image sensor 120, an AD converter 130, a demosaic part 140, a color blur remover 150, a sight corrector 160, a compression part 170, and a recorder 180.

Although a view field (imaging area or subject) shown in FIG. 3 and an R (red) ray 91, a G (green) ray 92, and a B (blue) ray 93 are not the elements of the color image pickup apparatus 100, they are illustrated for description purposes.

In FIG. 3, the taken view field 90 is imaged on the image sensor 120 via the imaging optical system 110. In general, an imaging optical system in a color image pickup apparatus is provided with a certain chromatic aberration correction. The longitudinal chromatic aberration of the imaging optical system 110 of this embodiment is well corrected for the R and G wavelength regions, and the longitudinal chromatic aberration leaves for the B wavelength region. Thus, other aberrational corrections can be improved and the image pickup apparatus can be made smaller by degrading the correction criteria of the longitudinal chromatic aberration in the B wavelength region.

Figure 4:
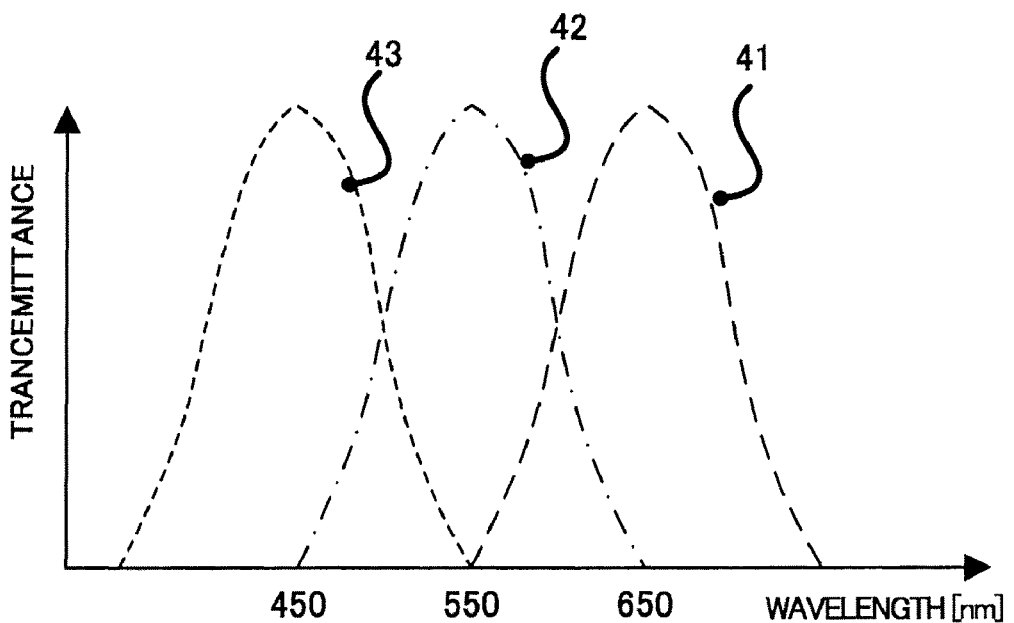
FIG. 4 is a graph showing a spectroscopic transmittance of a color filter.

The image sensor 120 is a single-plate color image sensor having a general primary color filter system. The primary color filter system includes three types of color filters 41, 42, 43 having main transmission bands near 650 nm, 550 nm, and 450 nm, as shown in FIG. 4, and images color planes corresponding to the RGB bands.

Figure 5:
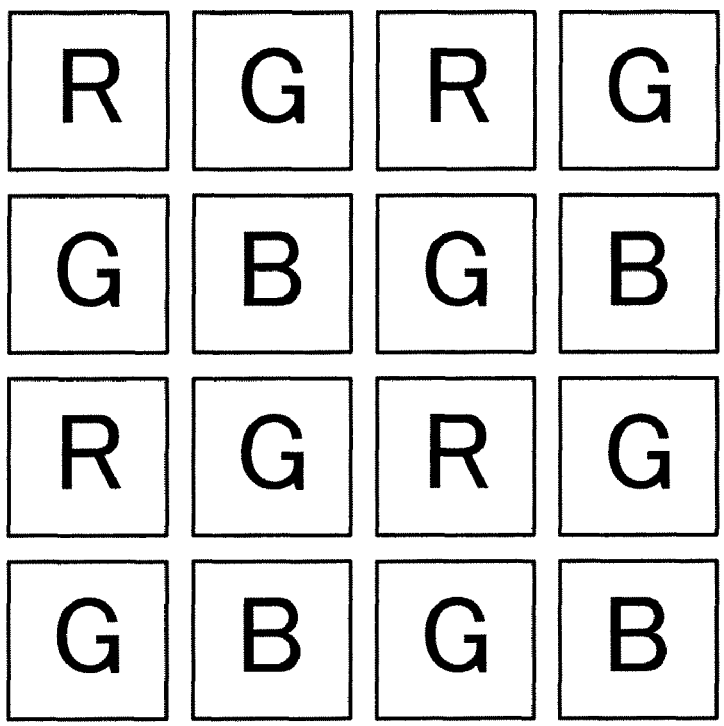
FIG. 5 is a view showing an arrangement of the color filter.

The single-plate color image sensor spatially arranges these color filters for each pixel, as shown in FIG. 5, and each pixel can provide the intensity of only a single color plane. Therefore, a color mosaic image is output from the image sensor 120.

A three-plate type color image sensor may be used, which splits the incident light into the RGB wavelength regions using a color splitting prism (not shown) and images the light having a different wavelength with a separate image sensor. In this case, the demosaic part 140 becomes unnecessary.

The AD converter 130 converts a color mosaic image output as an analog voltage from the image sensor 120, into digital data suitable for the subsequent image processing.

The demosaic part 140 interpolates a color mosaic image, and generates a color image in which all pixels have RGB color information. A variety of methods are proposed for the interpolation approach from a simple linear interpolation to a complicated approach introduced in E. Chang, S. Cheung, and D. Pan, "Color filter array recovery using a threshold-based variable number of gradients," Proc. SPIE, vol. 3650, pp. 36-43, January 1999. The interpolation approach of this embodiment can use any one of these methods or another method.

This embodiment uses a RGB primary color system for a color filter of the image sensor 120, but may use a color filter of a complementary color system, which provides a color image composed of the RGB color planes through the color conversion process.

Figure 6:
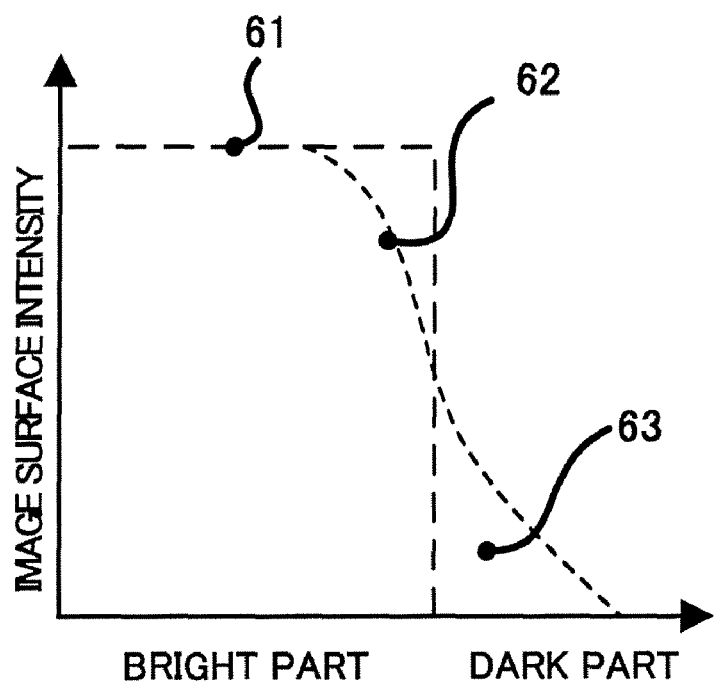
FIG. 6 is a view showing the image intensity at the boundary between the brightness and the darkness.

In a color image generated by the demosaic part 140, the resolution of the B (blue) plane is lower than each of the resolutions of the R (red) plane and the G (green) plane due to the chromatic aberration of the imaging optical system 110. Therefore, as shown in FIG. 6, an image 62 of the B plane is dimmer than an image 61 of the R or G plane and causes a color blur 63 like a blue fringe around the bright part.

The color blur remover 150 removes (or reduces) a color blur, such as this blue fringe, from a color image. A color blur removal (or reduction) process by the color blur remover 150 will be described in detail later.

The sight corrector 160 mainly processes a color image so as to improve its appearance of the image. This image correction includes, for example, a tone curve (gamma) correction, a chroma emphasis, a hue correction, and an edge emphasis.

As the last process, the compression part 170 compresses the corrected image using a method, such as JPEG, and reduces a size used for recording.

The color image that has undergone the compression process is recorded by the recorder 180 in a recording medium, such as a hard disc drive, a DVD, a magnetic tape, and a flash memory.

Those processing components from the image sensor 120 to the recorder 190 may actually include separate devices or a single microprocessor.

Figure 7:
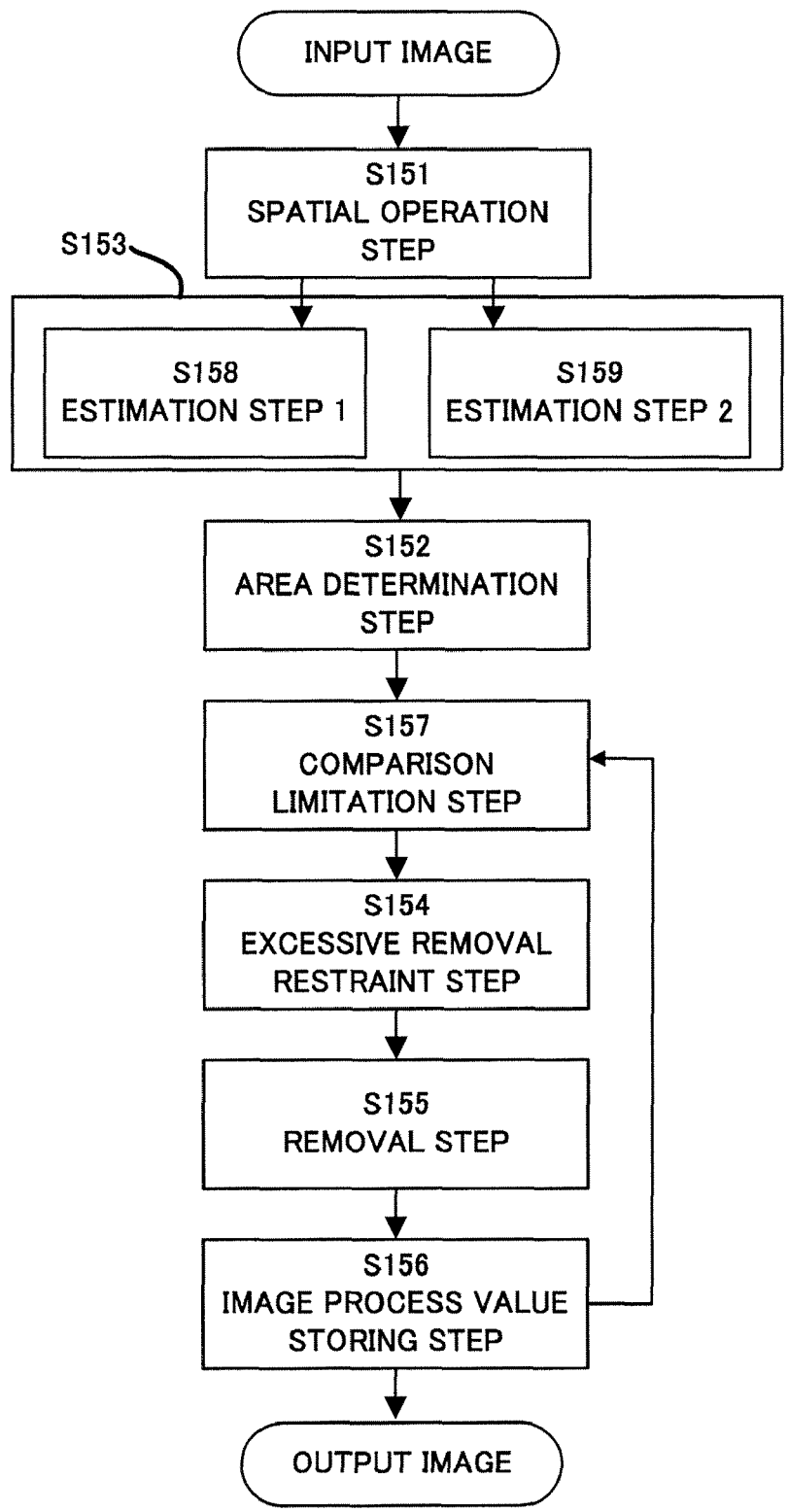
FIG. 7 is a flowchart showing a process of the color blur remover according to the first embodiment.

Referring now to a flowchart shown in FIG. 7, a description will be given of a process or an image processing method by the color blur remover 150. The color blur remover 150 includes a spatial operation step 151, an estimation step 153, an area determination step 152, a comparison limitation step 157, an excessive removal restraint step 154, a removal step 155, and an image process value storage step 156.

The above steps 151-157 can be regarded as elements of the color blur remover 150. The image process value storing step 156 forms a memory, and the spatial operation step 151 and estimation step 153 forms an estimator. The comparison limitation step 157 forms a determination part.

This embodiment sets the B plane to a color plane as a target of a color blur removal, and the G plane to a reference plane that is referred to in the color blur removal.

The following description refers to, in a continuous frame pixel group forming a color motion picture image obtained by imaging, a frame image that has been previously processed (although it might not be just previously processed) as a first frame image, and a frame image that is to be processed later (this time) as a second frame image. The B plane intensity represents a pixel value of the B plane.

Figure 8:
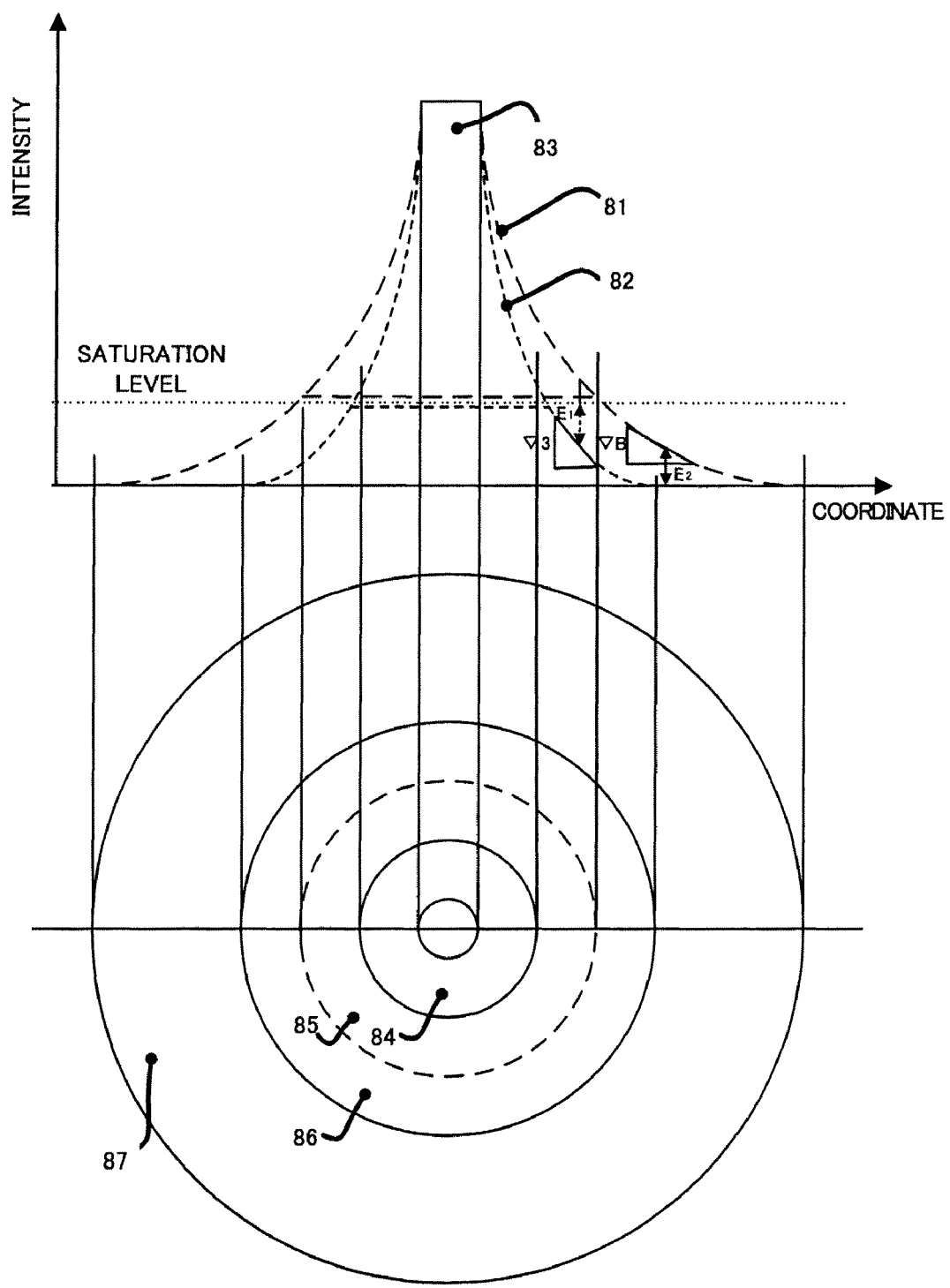
FIG. 8 is an explanatory view of a profile of a high brightness subject.

FIG. 8 shows a profile 81 of the typical B plane, and a profile 82 of the typical G plane of a high brightness subject. Since R and G form the same profile, a description thereof will be omitted. In the top in FIG. 8, an abscissa axis denotes a section of an image, and an ordinate axis denotes the intensity. A high brightness subject 83 that exceeds a saturation level of an image sensor is provided at the center. The blurred light is generated due to the flare and the aberration of the imaging optical system 110 from the high brightness subject 83, and forms an intensity distribution around the high brightness subject 83. This intensity distribution depends upon the intensity of the high brightness subject 83, and weakens like an exponential function as a distance from the high brightness subject 83 increases. The intensity distribution range of the G plane is smaller than that of the B plane.

When the image sensor 120 images the high brightness subject 83 shown at the top of FIG. 8, an image at the bottom of FIG. 8 is obtained. Since the image sensor 120 cannot measure the intensity equal to or greater than the saturation level, a white saturation area 84 in which G and B are saturated is formed and the white saturation area 84 is greater than the high brightness subject 83. Formed around the white saturation area 84 are a light blue saturation area 85 in which B is saturated and G is attenuated, a light blue saturation area 86 in which both B and G are attenuated, and a blue area 87 in which G disappears and only B has an intensity.

Among them, the bluishness of the light blue saturation area 85, light blue saturation area 86, and blue area 87 brings a unnatural sense. If the blur of B is similar to G, the blur is recognized as a color of the high brightness subject 83 or a natural blur.

As discussed, a blur is a useful image expression that indicates the brightness of the high brightness subject 83 beyond the saturation level of the image sensor 120.

This embodiment estimates a B blur amount (or calculates an estimation blur amount) in a color image (second frame image) by using a slope of a profile of the B plane.

When $\nabla B$ is a brightness slope map to the B plane and $\nabla G$ is a brightness slope map to the G plane, the spatial operation step 151 calculates $\nabla R$ and $\nabla B$ by a spatial operation using the following equations:

$$\nabla B = \left(\frac{dB}{dx}, \frac{dB}{dy}\right) \quad \text{EQUATION 1}$$
$$\equiv \left(\frac{B(x+1, y) \cdot B(x-1, y)}{2}, \frac{B(x, y+1) \cdot B(x, y-1)}{2}\right)$$

$$\nabla G = \left(\frac{dG}{dx}, \frac{dG}{dy}\right)$$
$$\equiv \left(\frac{G(x+1, y) \cdot G(x-1, y)}{2}, \frac{G(x, y+1) \cdot G(x, y-1)}{2}\right)$$

G(x+1, y) and B(x+1, y) are values of the G and B planes for a pixel next to the target pixel at the right side.

G(x−1, y) and B(x−1, y) are values of the G and B planes for a pixel next to the target pixel at the left side.

G(x, y+1) and B(x, y+1) are values of the G and B planes for a pixel next to the target pixel at the bottom side.

G(x, y−1) and B(x, y−1) are values of the G and B planes for a pixel next to the target pixel at the top side.

The estimation step 153 estimates the extra intensity of the B plane that causes a color blur for each pixel of the color image (second frame image). While the estimation approach differs according to whether or not B is saturated, the estimation step 1 (158) and estimation step 2 (159) calculate two types of color blur estimation amounts $E_1$ and $E_2$ in order to handle both cases.

In the light color area 86 and the blue area 87 in which B is not saturated, the estimation step 1 (158) calculates the color blur estimation amount $E_1$. The estimation step 1 (158) calculates the color blur estimation amount $E_1$ by multiplying an absolute value of the B's brightness slope $\nabla B$ by a coefficient $k_1$ where $k_1$ is a positive value and can be about 3.

$$E_1 = k_1 \cdot |\nabla B| \quad \text{EQUATION 2}$$

On the other hand, the B's brightness slope becomes 0 in the light blue saturation area 85 in which B is saturated, and no brightness slope before the saturation is obtained. The estimation step 2 (159) calculates the color blur estimation amount $E_2$ for such an area. The estimation step 2 (159) calculates the color blur estimation amount $E_2$ by using the G's brightness slope $\nabla G$ and the following equation, where $k_2$ is a positive value and can be about 3.

$$E_2 = k_2 \cdot |\nabla G| \qquad \text{EQUATION 3}$$

The area determination step 152 nonlinearly converts the intensity of the B plane, and generates a saturation degree S. The saturation degree S represents whether the B is saturated, and becomes 1 where the B's intensity is saturated, and 0 where the B's intensity is small. $E_1$ or $E_2$ calculated by the estimation step 153 is selected by using the saturation degree S:

$$E = \begin{cases} E_1 & (S = 0) \\ E_2 & (S = 1) \end{cases} \qquad \text{EQUATION 4}$$

The comparison limitation step 157 subtracts the previous color blur removal amount Ep (which is a first color blur reduction amount used for the color blur reduction process to the first frame image) stored by the image process value storing step 156 from the color blur estimation amount E. When the post-subtraction value (difference) falls within a predetermined range from a lower limit value 11 to a upper limit value 12, the color blur estimation amount E (or a second color blur reduction amount used for the color blur reduction process to the second frame image) is supplied to the excessive removal restraint step 154.

When the value after the color blur removal amount Ep is subtracted from the color blur estimation amount E is smaller than the lower limit value 11, a sum (second color blur reduction amount) of the color blur removal amount Ep and the lower limit value 11 is supplied to the excessive removal restraint step 154. When the value after the color blur removal amount Ep is subtracted from the color blur estimation amount E is greater than the upper limit value 11, a sum (second color blur reduction amount) of the color blur removal amount Ep and the upper limit value 12 is supplied to the excessive removal restraint step 154.

Thus, this embodiment restricts the color blur estimation amount E for the second frame image (second color blur reduction amount) so that a difference between the color blur estimation amount E and the color blur removal amount Ep (or the first color blur reduction amount) used for the process to the first frame image can fall within the predetermined range.

As described later, the excessive removal restraint step 154 of this embodiment corrects a color blur estimation amount (second color blur reduction amount) E, and calculates a color blur removal amount E' that is to be actually applied to a color image as a second frame image. However, the present invention includes both the color blur estimation amount E calculated by the comparison limitation step 157 and the color blur removal amount E' in the "second color blur reduction amount used for the color blur reduction process to the second frame image." The excessive removal restraint step 154, which will be described later, is not necessary provided.

The absolute values of the above lower limit value 11 and upper limit value 12 may be set greater as a distance to the high brightness subject reduces. The lower limit value 11 and the upper limit value 12 may be set approximately equally or differently to some extent.

Figure 9A:
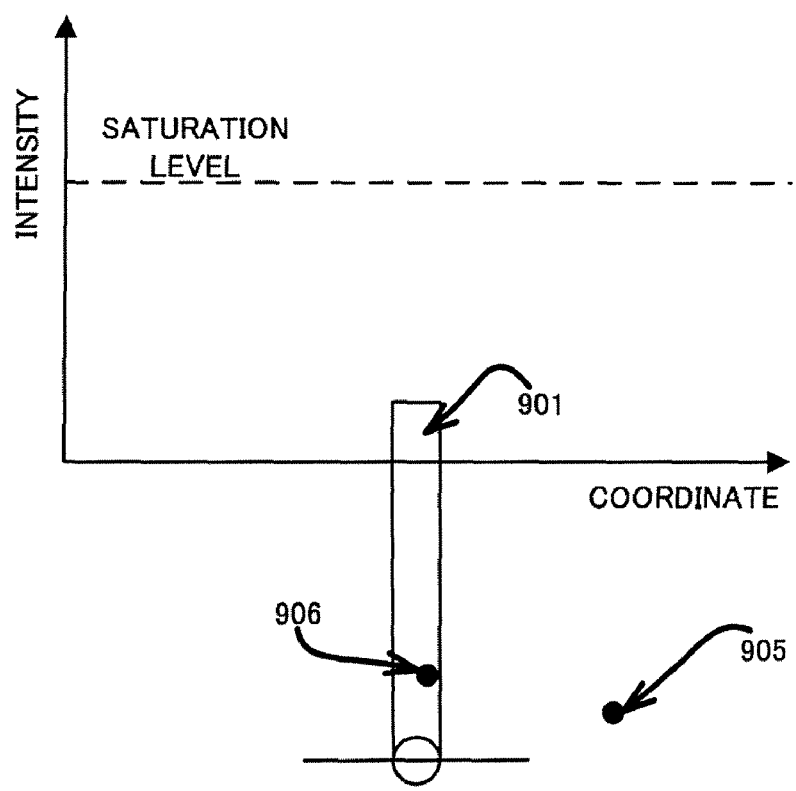
FIGS. 9A-9C each is an explanatory view showing a time change of the profile.
Figure 9B:
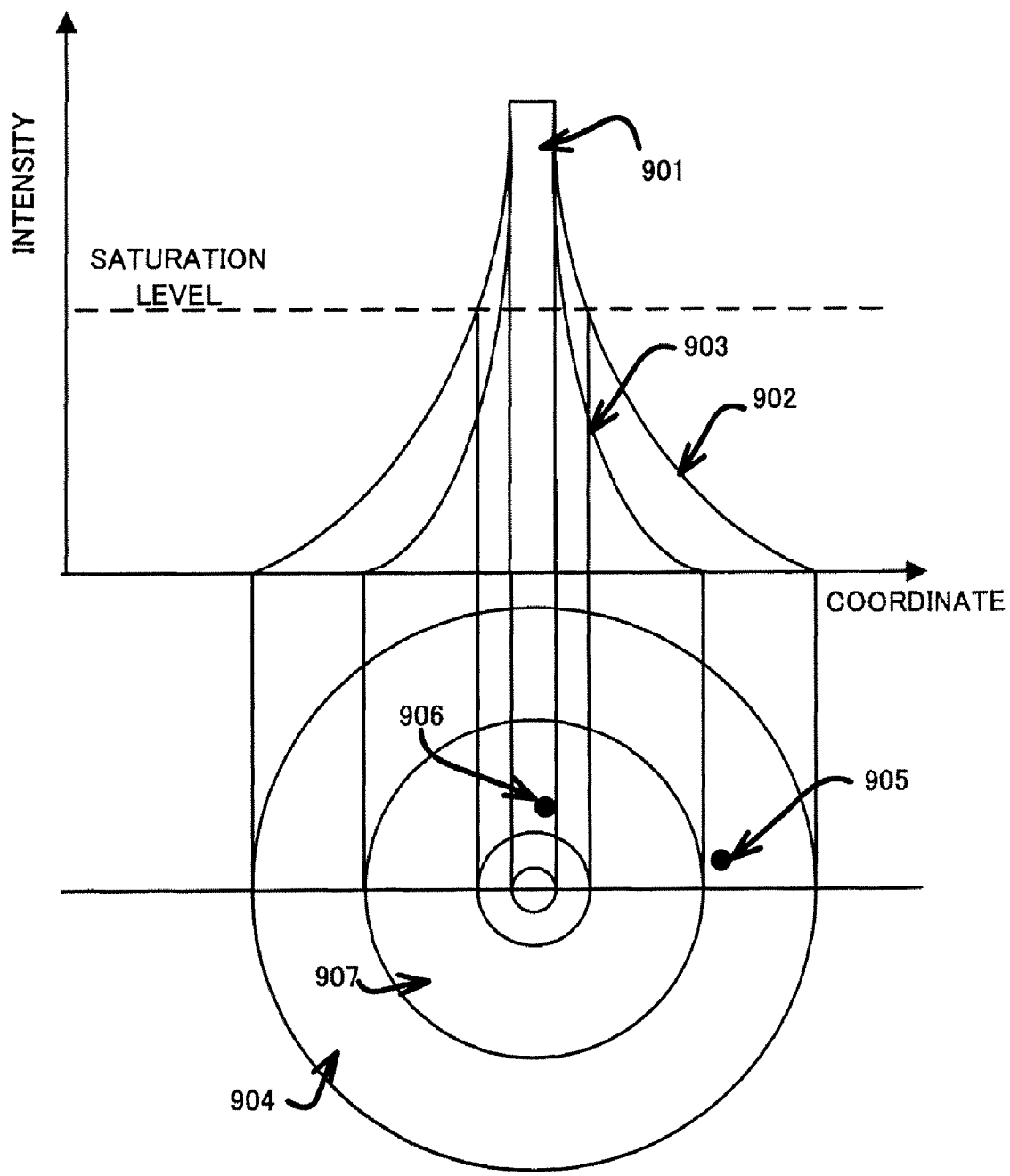
Figure 9C:
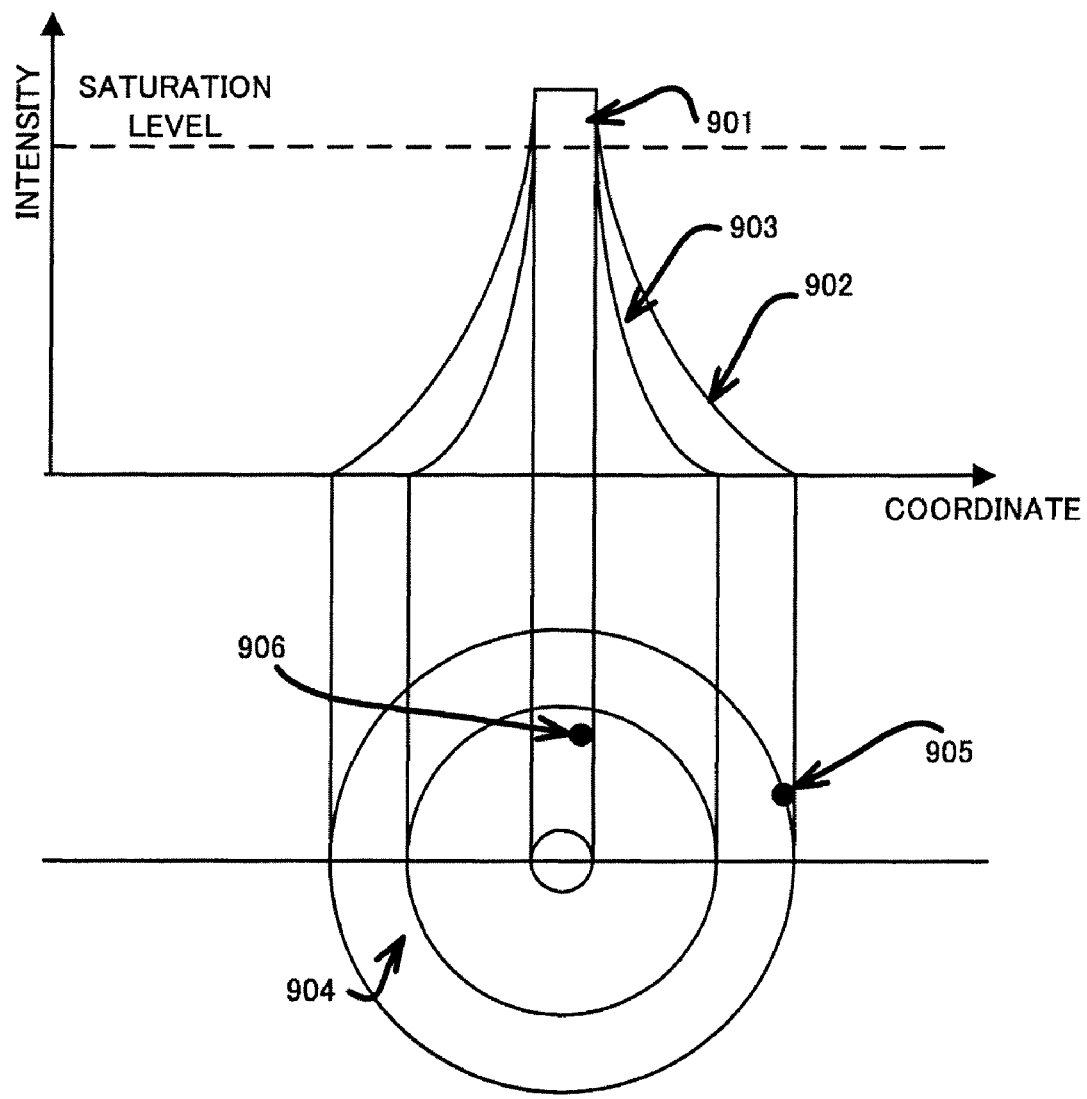

FIGS. 9A-9C show images obtained through imaging of the flashing high brightness subject 901, a profile 902 of the typical B plane, and a profile 903 of the G plane. Since R and G form the same profile, a description thereof will be omitted.

In each of the tops of FIGS. 9A-9C, an abscissa axis denotes a section on an image, and an ordinate axis denotes the intensity. As shown in FIG. 9B, the blurred light is generated around the high brightness subject 901 due to the flare and the aberration of the imaging optical system 110, and forms an intensity distribution. This intensity distribution depends upon the intensity of the high brightness subject 901, and weakens like an exponential function as a distance from the high brightness subject 901 increases, causing a blue blur area 904 and a light blue blur area 907.

Assume that the high brightness subject 901 changes with time in order of time T1 (FIG. 9A), time T2 (FIG. 9B), and time T3 (FIG. 9C), above or below the saturation level of the image sensor 120. Then, the blue blur area 904 and the light blue blur area 907 disappear as in FIG. 9A, appear as in FIG. 9B, or reduce as in FIG. 9C.

Figure 10A:
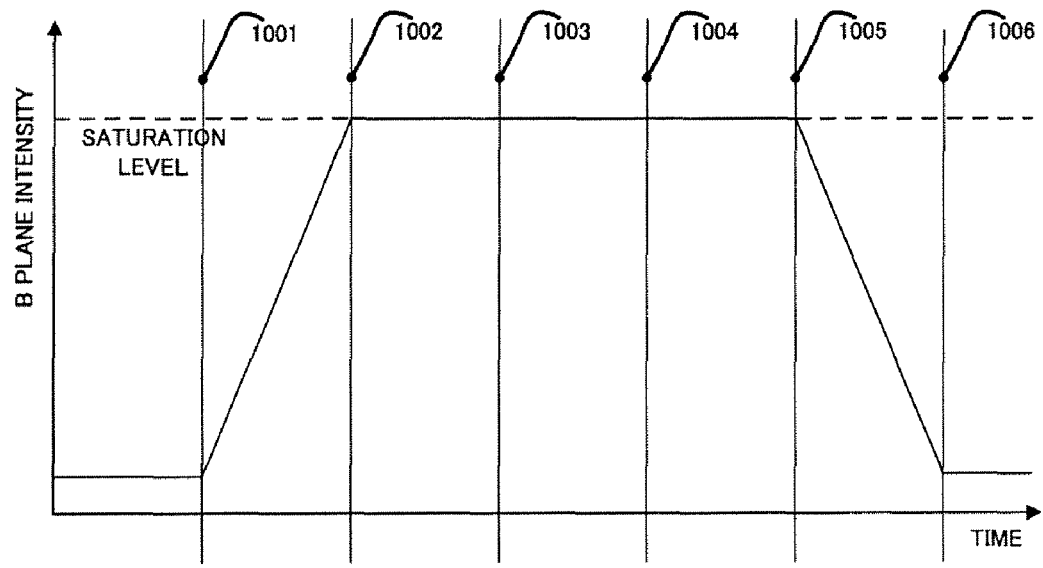
FIGS. 10A-10C each is a view for explaining an effect of restricting a color blur estimation amount according to the first embodiment.
Figure 10B:
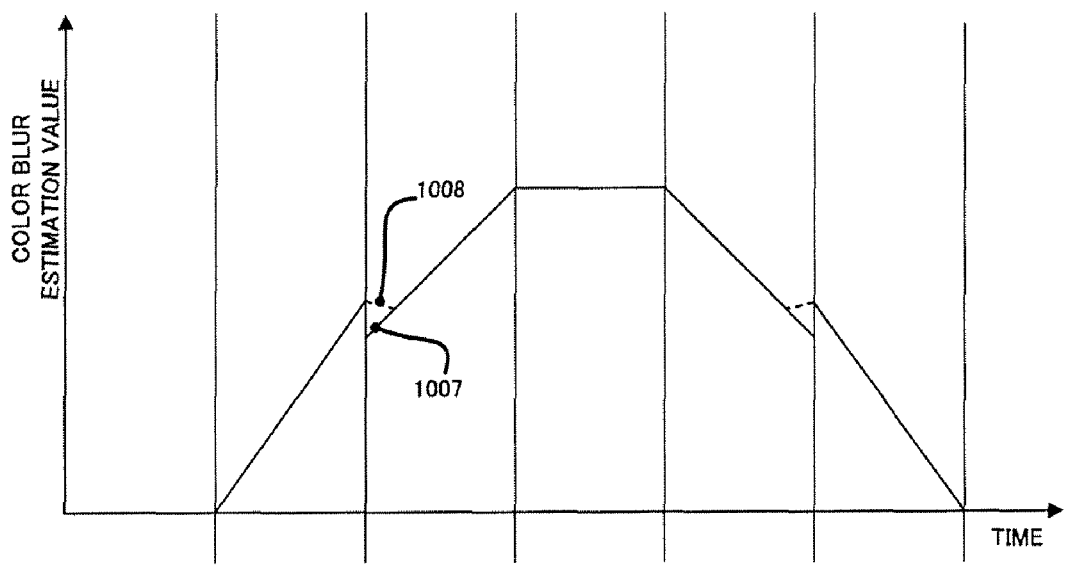
Figure 10C:
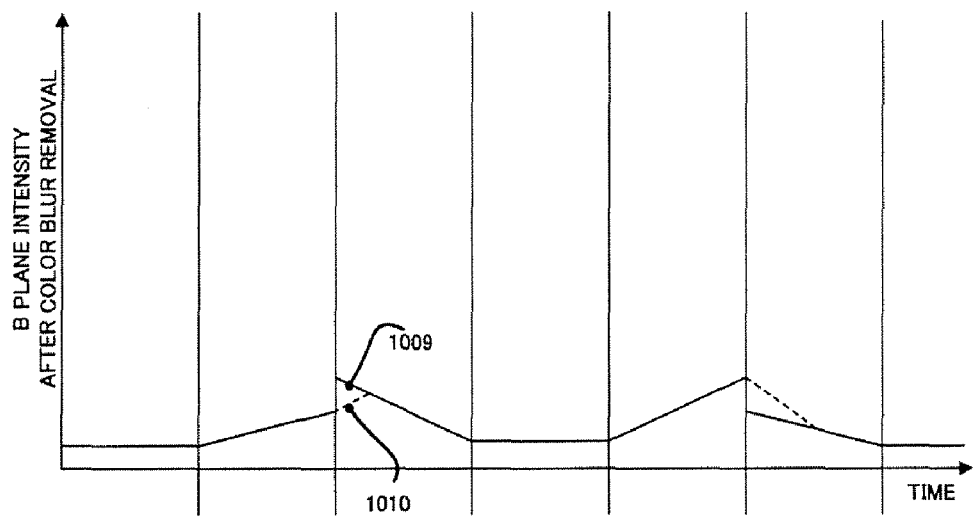

FIGS. 10A, 10B and 10C show time changes of the B plane intensity, the color blur estimation amount, and the B plane intensity after the color blur reduction, at a point 905 near the thus-changing high brightness subject 901.

As shown in FIG. 10A, as the light intensity of the high brightness subject 901 increases, the B plane intensity at the point 905 starts increasing (1001) and finally reaches the saturation level (1002). The light intensity of the high brightness subject 901 further increases, and becomes a constant value (1003), but the B plane intensity is saturated and constant during this period. As the light intensity of the high brightness subject 901 decreases (1004), the B plane intensity becomes less than the saturation level (1005), further decreases, and becomes constant at the point 905 (1006).

During this period, as shown in FIG. 10B, according to the prior art (1007) that does not limit a color blur estimation amount, a color blur estimation amount at the point 905 suddenly changes due to switching (1002, 1005) between the estimation step 1 (158) and the estimation step 2 (159) by the area determination step 152. On the other hand, according to this embodiment (1008), the color blur estimation amount E gently changes so that the difference between the color blur estimation amount E and the color blur estimation amount used for the previous process to the first frame image can fall within the predetermined change.

As a result, as shown in FIG. 10C, according to the prior art (1009), the B plane intensity after the color blur removal at the point 905 suddenly changes at the time of switching (1002, 1005), and causes a sense of discomfort to a viewer. On the other hand, according to this embodiment (1010), the B plane intensity at the point 905 after the color blur removal gently changes and is less likely to bring a sense of discomfort to a viewer.

The excessive removal restraint step 154 further corrects the color blur estimation amount E supplied from the above comparison limitation step 157, and calculates a color blur removal amount E' that is used as a color blur amount to be actually removed. The color blur amount estimated by the estimation step 153 is pursuant to a certain model, and does not necessarily accord with the actual blur amount. For example, the blur of the light detected by the same B plane changes between the light with the wavelength of 450 nm and the light with the wavelength of 400 nm, but the estimation step 153 does not consider this. When the removal amount is excessively small, a bit of bluishness leaves even after the removal.

On the other hand, when the removal amount is excessively large, B is excessively reduced in comparison with the gray background and becomes yellow-green. The latter is particularly unnatural, and brings a sense of discomfort to a viewer. Accordingly, the excessive removal restraint step 154 limits the color blur removal only in a certain hue range.

Therefore, a chroma of a pixel is calculated. Assume the following equation for each of the RGB plane intensities.

$$\begin{pmatrix} x \\ y \\ z \end{pmatrix} = \begin{pmatrix} 0.41 & 0.36 & 0.18 \\ 0.21 & 0.75 & 0.07 \\ 0.02 & 0.12 & 0.95 \end{pmatrix} \begin{pmatrix} R \\ G \\ B \end{pmatrix} \quad \text{EQUATION 5}$$

$$a = 5 \ (x - y)$$

$$b = 2 \ (y - x)$$

Figure 11:
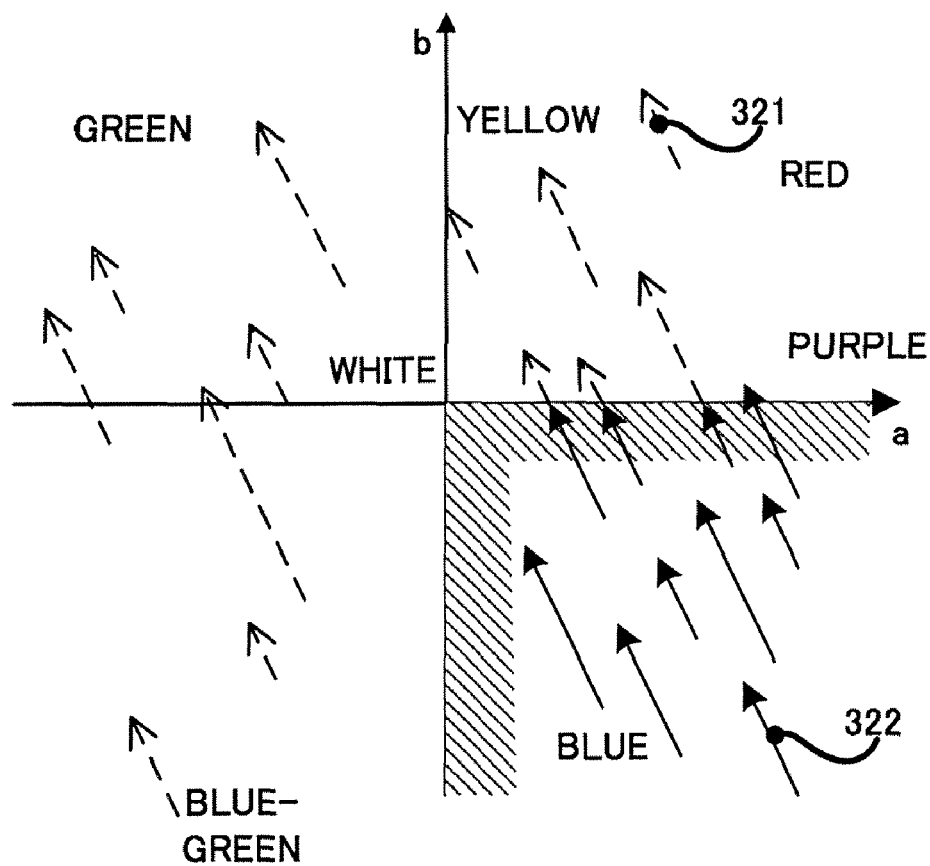
FIG. 11 is a view for explaining a change on a chromaticity diagram due to a color blur reduction.

FIG. 11 shows the chroma coordinate ab plane. Blue is located in the fourth quadrant, and moves like a dotted arrow 321 in the upper left direction when the estimation E is removed from the B plane intensity. When a starting point of an arrow is a chroma before the removal, and a tip is a chroma after the estimation amount E is removed.

When the hue range in which the color blur removal works is limited to a>0 and b<0, B>0.22R+0.68G and B>−1.84R+3.30G.

The step 154 sets E'=0 to the pixel that does not satisfy the condition so as to remove the pixel from the removal target. Thereby, these pixels do not change due to the removal step 155, and the pixel value is not affected by the color blur removal part 150. In other words, only the pixel that satisfies the above condition becomes the removal target.

Moreover, even for the pixel that satisfies the condition, the color blur removal amount E' is set to E'=min(E, B−(0.22R+0.68G), B−(−1.84R+3.30G)) and supplied to the removal step 155. The chroma change due to the blur removal corresponding to this color blur removal amount E' remains in the fourth quadrant as shown by a solid arrow 322 in FIG. 11. Thereby, the removal step 155 prevents a decrease of B beyond the hue limitation range.

The removal step 155 subtract the color blur removal amount E' from the B plane intensity, and sets a new B plane intensity to B=B−E'.

The image process value storing step 156 stores the above color blur removal amount E' as Ep, and prepares for the subsequent process (to the frame image obtained after the second frame image).

The color image in which the B plane is corrected is supplied to the sight corrector 160 as an output of the color blur remover 150.

This embodiment thus effectively removes a blue blur of a flashing or moving high brightness subject, and provides a natural color image that does not cause a sense of discomfort.

In the accompanying imaging optical system 110, a limitation of the longitudinal chromatic aberration of the B wavelength range can be mitigated, and another aberrational correction can be improved and the image pickup apparatus can be made smaller.

Second Embodiment

Next follows a description of a second embodiment according to the present invention. The first embodiment restricts the color blur estimation amount E, whereas this embodiment restricts the B plane intensity after the color blur estimation amount is removed (or the image pixel value of the second frame image after the color blur reduction). Therefore, the process performed by the color blur remover 150 in the color image pickup apparatus shown in FIG. 3 is different from the first embodiment.

Figure 12:
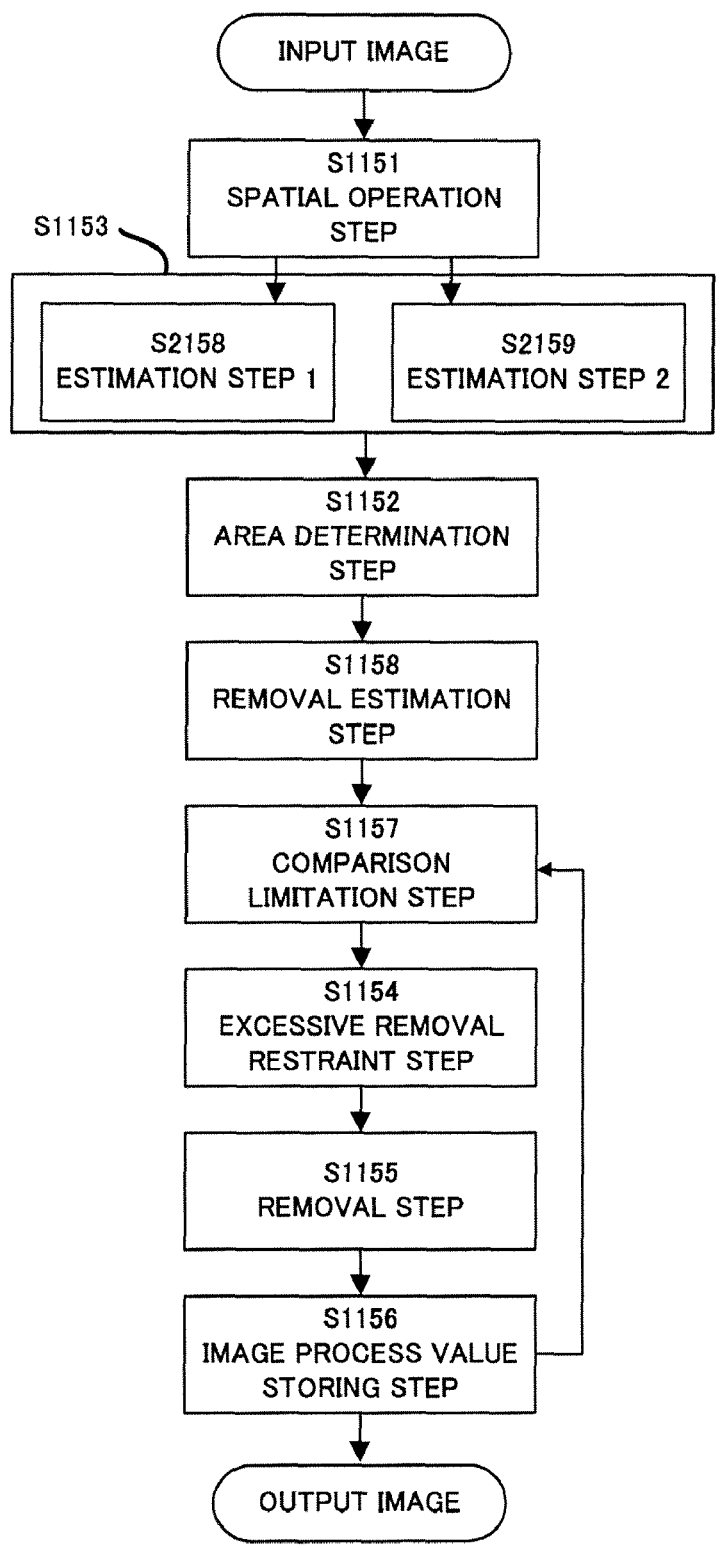
FIG. 12 is a flowchart of a color blur remover according to a second embodiment of the present invention.

Referring to a flowchart of FIG. 12, a description will be given of a process of the color blur remover 150 of this embodiment. The color blur remover 150 includes a spatial operation step 1151, an estimation step 1153, an area determination step 1152, a removal estimation step 1158, a comparison limitation step 1157, an excessive removal restraint step 1154, a removal step 1155, and an image process value storing step 1156.

The above steps 1151 to 1158 can be regarded as the elements of the color blur remover 150. The image process value storing step 1156 forms a memory, and the spatial operation step 1151 and the estimation step 1153 form a first estimator. The removal estimation step 1158 forms a second estimator, and the comparison limitation step 1157 forms a determination part.

The spatial operation step 1151, the estimation step 1153, the area determination step 1152, the excessive removal restraint step 1154, and the removal step 1155 are similar to those of the first embodiment. However, the excessive removal restraint step 1154 and the removal step 1155 deal with the B plane intensity as an estimation pixel value rather than the color blur estimation amount. The estimation step 1153 is provided with the estimation step 1 (2158) and the estimation step 2 (2159), which are similar to those described for the first embodiment.

The removal estimation step 1158 subtracts the color blur estimation amount E obtained at the estimation step 1153 from the B plane intensity of the color image as a second frame image, and calculates the B plane intensity as the estimation pixel value after the color blur reduction.

The comparison limitation step 1157 subtracts the B plane intensity Bp stored in the image process value storing step 1156 (or a first pixel value obtained as a result from the color blur reduction process to the first frame image) from the B plane intensity as the above estimation pixel value. When this subtracted value (difference) falls within a predetermined range from the lower limit value 13 to the upper limit value 14, the B plane intensity as this estimation pixel value is supplied as a second pixel value to the excessive removal restraint step 1154.

When the subtracted value is lower than the lower limit value 13, the B plane intensity (second pixel value) as a sum of the lower limit value 13 and the B plane intensity Bp is supplied to the excessive removal restraint step 1154. When the subtracted value exceeds the upper limit value 14, the B plane intensity (second pixel value) as a sum of the upper limit value 14 and the B plane intensity Bp is supplied to the excessive removal restraint step 1154.

Thus, this embodiment restricts the B plane intensity (second pixel value) output after the color blur removal to the second frame image so that a difference between the estimated B plane intensity (estimation pixel value) obtained after the color blur removal to the second frame image and the B plane intensity (first pixel value) Bp obtained by the color blur removal to the first frame image can fall within the predetermined range.

Similar to the first embodiment, even in this embodiment, the excessive removal restraint step 1154 corrects the B plane intensity as the second pixel value, and calculates a pixel value of an actually output color image. However, the present invention includes the B plane intensity calculated by the comparison limitation step 1157 with the B plane intensity corrected by the excessive removal restraint step 1154 in the "second pixel value output as a result of the color blur reduction process to the second frame image." The excessive removal restraint step 1154 is not necessarily provided.

The absolute values of the above lower limit value 13 and upper limit value 14 may be set greater as a distance to the high brightness subject reduces. The lower limit value 13 and upper limit value 14 may be set approximately equally or differently to some extent.

Like FIGS. 9A-9C, FIGS. 13A, 13B, and 13C show time changes of the B plane intensity, the color blur estimation amount, and the B plane intensity after the color blur reduction, at the point 905 near the thus brightness-changing high brightness subject 901.

Figure 13A:
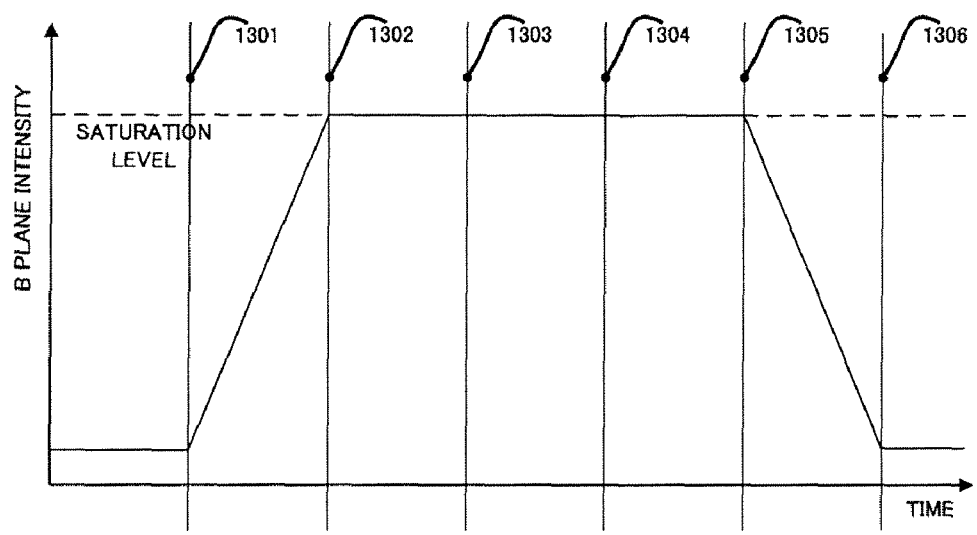
FIGS. 13A-13C each is a view for explaining an effect of restricting the B plane intensity after the color blur removal according to the second embodiment.

As shown in FIG. 13A, as the light intensity of the high brightness subject 901 increases, the B plane intensity at the point 905 starts increasing (1301) and finally reaches the saturation level (1302). The light intensity of the high brightness subject 901 further increases, and becomes a constant value (1303), but the B plane intensity is saturated and constant. As the light intensity of the high brightness subject 901 decreases (1304), the B plane intensity also becomes less than the saturation level (1305), further decreases, and becomes constant at the point 905 (1306).

Figure 13B:
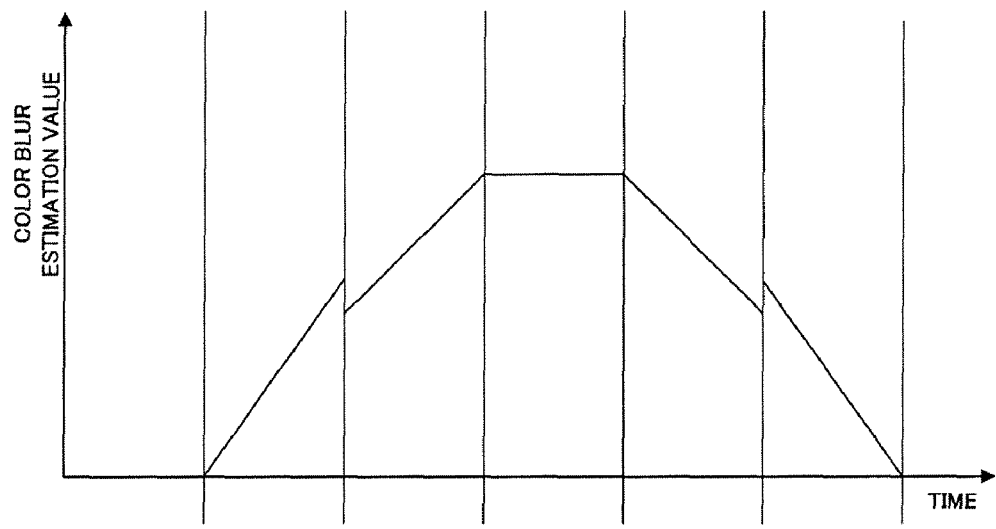

During this period, as shown in FIG. 13B, the color blur estimation amount at the point 905 suddenly changes due to switching (1302, 1305) between the estimation step 1 (2158) and the estimation step 2 (2159) by the area determination step 1152.

Figure 13C:
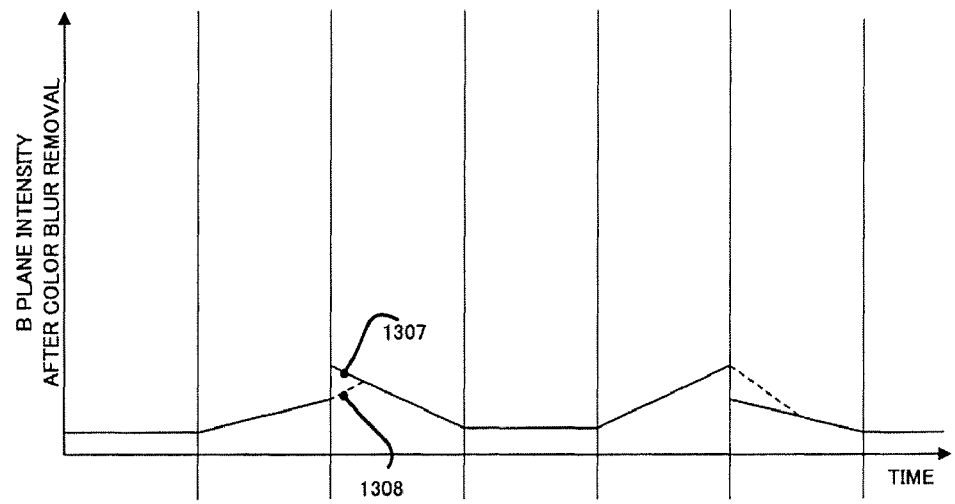

As a result, as shown in FIG. 13C, according to the prior art (1307), the B plane intensity after the color blur removal at the point 905 suddenly changes at the time of switching (1302, 1305), and causes a sense of discomfort to a viewer. On the other hand, according to this embodiment (1308), the B plane intensity after the color blur removal at the point 905 gently changes and is less likely to bring a sense of discomfort to a viewer.

The image process value storing step 1156 stores the B plane intensity as Ep, and prepares for the subsequent process (to the frame image obtained after the second frame image).

This embodiment thus effectively removes a blue blur of a flashing or moving high brightness subject, and provides a natural color image that does not cause a sense of discomfort.

In addition, the color image pickup apparatus of this embodiment can restrain the chromatic aberration of the wavelength range corresponding to at least one color plane through the optical system and another chromatic aberration through image processing, obtaining a proper image through the combination.

Third Embodiment

Next follows a description of a third embodiment according to the present invention. This embodiment discusses an example that changes, based on a spatial operation result, the lower and upper limit values used to restrict the color blur estimation amount described in the first embodiment.

Figure 14:
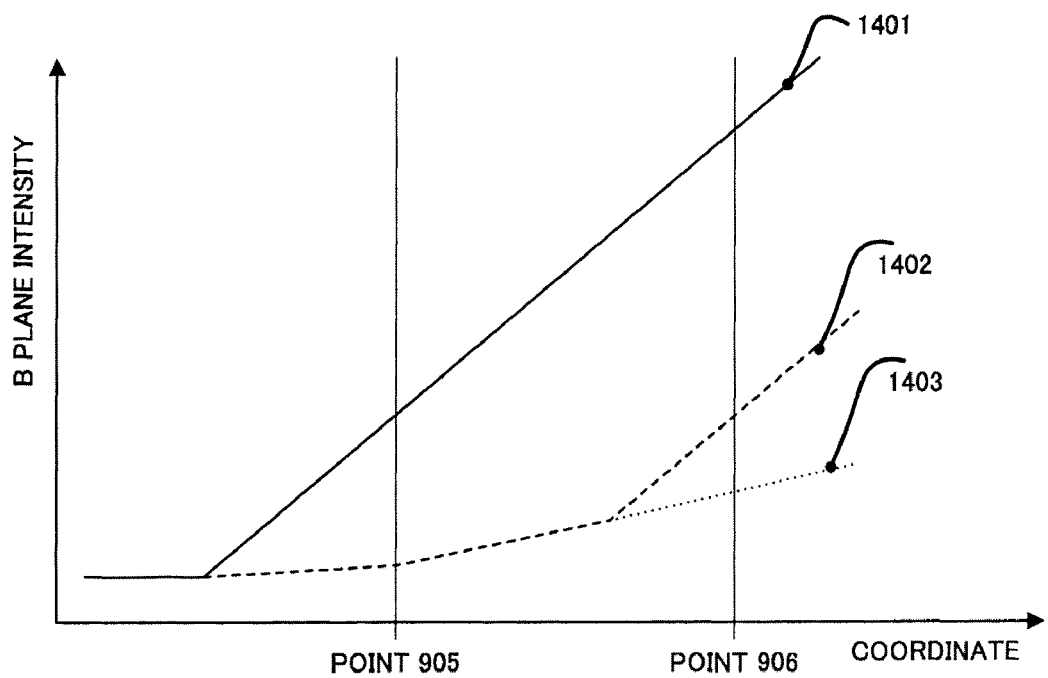
FIG. 14 is a view for explaining an effect of changing a color blur estimation amount through a spatial operation step according to a third embodiment of the present invention.

A point 906 shown in FIGS. 9A-9C is closer to the high brightness subject 901, and has a greater color blur estimation amount than the point 905. When the lower and upper limit values used to restrict the color blur estimation amount are made constant in an image, as understood from a comparison between the B plane intensity 1401 before the color blur removal and the B plane intensity 1402 after the removal shown in FIG. 14, a color blur can be sufficiently removed from the point 905 having a smaller color blur than the upper limit value. However, the color blur cannot be sufficiently eliminated from the point 906 having a color blur that exceeds the upper limit value, and may bring a sense of discomfort to a viewer.

The brightness slopes ∇G and ∇B (or the spatial operation values) calculated by the spatial operation step 151 increase due to a distance from the high brightness subject 901 and the brightness of the high brightness subject 901.

This embodiment estimates the distance from the high brightness subject 901 and the brightness of the high brightness subject 901 based on the brightness slopes ∇G and ∇B, and changes the upper and lower limit values used to restrict the color blur estimation amount. In other words, this embodiment changes the upper and lower limit values based on the result of the spatial operation. Thereby, the limitation of the color blur estimation amount at the point 906 near the high brightness subject 901 can be mitigated. Thus, similar to the point 905, as shown in the B plane intensity 1403 after the color blur removal, the color blur can be sufficiently removed and an image that does not bring a sense of discomfort to the viewer can be provided.

This embodiment thus effectively removes the blue blur of the flashing or moving high brightness subject, and provides a natural color image that does not cause a sense of discomfort.

The upper and lower limit values in the second embodiment may be similarly changed based on the spatial operation.

Fourth Embodiment

Next follows a description of the fourth embodiment according to the present invention. This embodiment discusses an example that removes the color blur from the relatively quickly moving or flashing high brightness subject without bringing a sense of discomfort by comparing and limiting the color blur estimation amount only when the area determination step 152 switches the color blur estimation amount.

Figure 15A:
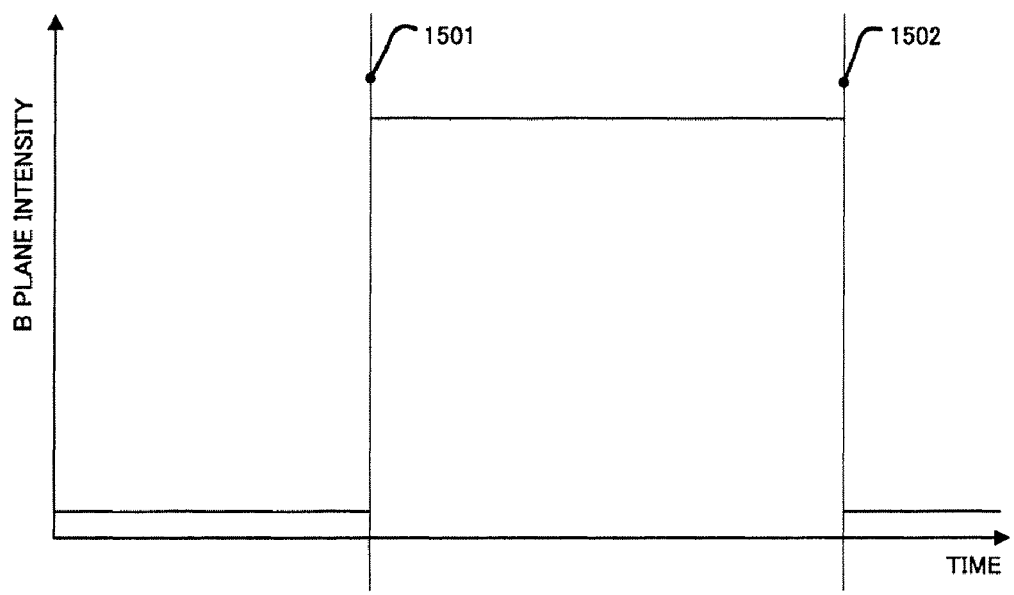
FIGS. 15A-15C each is a view for explaining an effect of limiting a restraint of the color blur estimation amount according to a fourth embodiment of the present invention when the estimation step switches a color blur estimation amount.
Figure 15B:
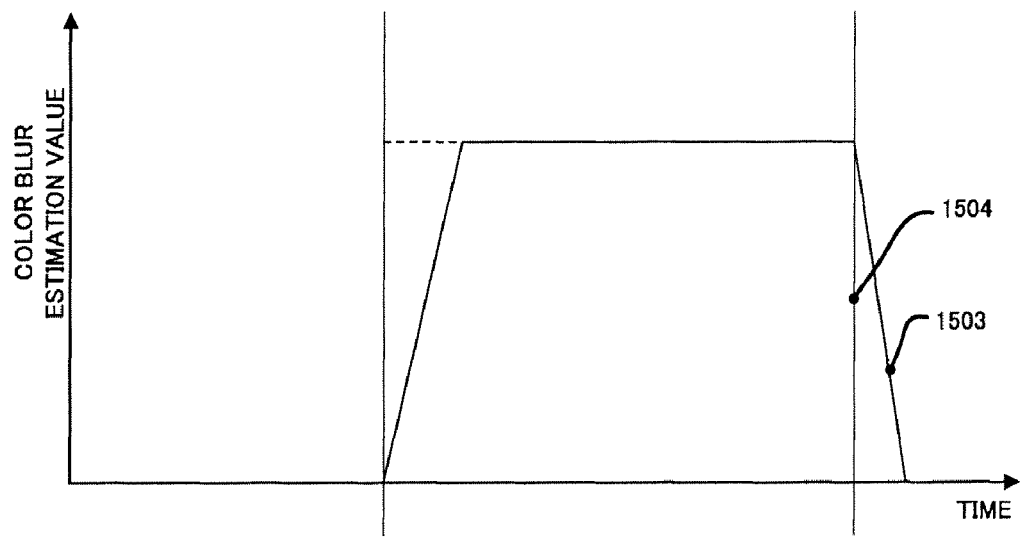
Figure 15C:
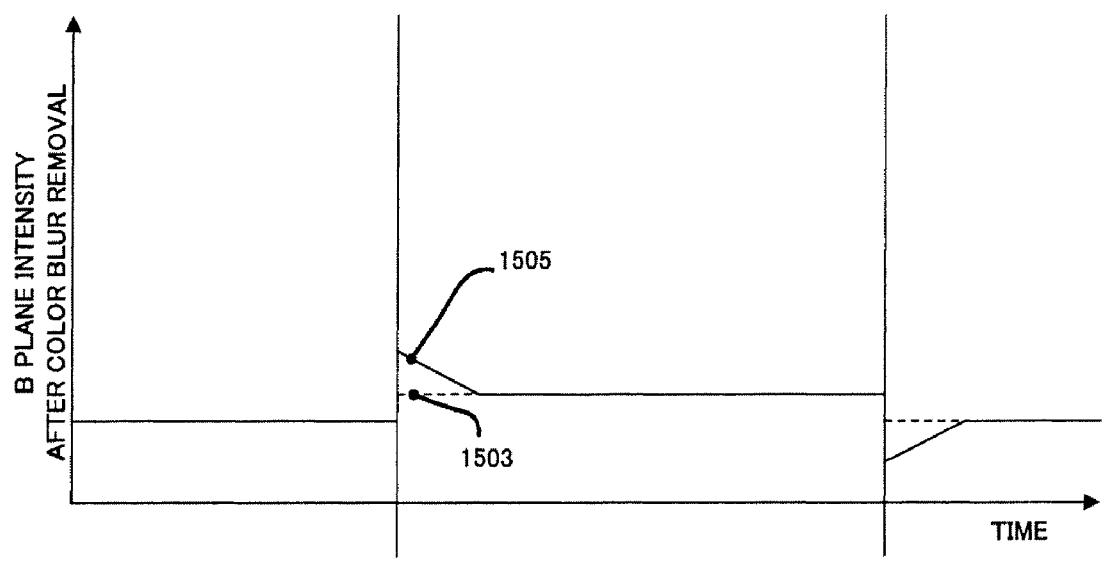

FIG. 15A shows time changes of the B plane intensity before the color blur removal. As illustrated, when the B plane intensity at the point 905 abruptly changes due to the comparatively fast turning-on 1501 and turning-off 1502 of the high brightness subject 901, the color blur estimation amount changes with time as shown by 1503 in FIG. 15B due to the limitation to the color blur estimation amount. As a result, as shown by 1505 in FIG. 15C, the B plane intensity after the color blur removal abruptly changes, bringing a sense of discomfort to a viewer.

This embodiment restricts the color blur estimation amount only when the area determination step 152 switches the estimation step 1 (158) and the estimation step 2 (159). Thereby, when the high brightness subject 901 comparatively quickly flashes, the color blur estimation amount can follow this and be calculated as shown by 1504 in FIG. 15B. As a result, as shown by 1506 in FIG. 15C, the B plane intensity after the color blur removal gently changes, bringing an image that has no sense of discomfort to a viewer.

Thus, this embodiment can effectively remove the bluishness of the flashing or moving high brightness subject, and provide a natural color motion picture image that does not bring a sense of discomfort.

In addition, the above first to fourth embodiments discuss the color image pickup apparatus that includes all components from the imaging optical system 110 to the recorder 180. However, an image processing apparatus (such as a personal computer) having at least the color blur remover 150 may be formed as an apparatus separate from the color image pickup apparatus. In this case, a color image taken by the color image pickup apparatus and stored in a recording medium, such as a semiconductor memory and a magnetic/optical disc, may be input into the image processing apparatus. In addition, the color image pickup apparatus and the image processing apparatus may be connected to each other via a cable, a radio LAN, etc. so as to send an image from the color image pickup apparatus to the image processing apparatus.

A supplemental description will be given of each step described in the above embodiments.

The spatial operation step refers to a removal-target color plane and a reference plane, and operates an intensity slope of each of the removal-target color plane and the reference plane. The reference plane is a color plane having an intensity of a wavelength region in which a chromatic aberration of the imaging optical system is well corrected, or a plane indicative of the brightness, and the reference plane is generally the G or Y plane.

The estimation step outputs a value depending upon the intensity (or brightness) slope, or may simply output a value proportional to the intensity slope. In addition, the estimation step may switch an estimation method of the color blur estimation method, selects one of a plurality of color blur estimation amounts, or interpolate the plurality of color blur estimation amounts, depending upon whether the brightness saturation pixel exists in the removal-target color plane.

The removal step subtracts the image intensity of the removal-target color plane. The color plane that serves as a removal target can be the R or B plane, but may be a color plane U/V indicative of a corresponding hue.

The excessive removal restraint step may be provided prior to the removal step so as to prepare for the excess or deficiency of the color blur estimation amount. The excessive removal restraint step sets a removal target only to pixels in a certain color range so that they are maintained in a color range after the removal. The excessive removal restraint operation may be implemented within a predetermined hue angle.

In addition, the removal target may be set only to an image range in which the intensity of the removal-target color plane is greater than the intensity of the reference plane. When the estimation amount runs short, a bit of color blur leaves due to the removal deficiency. When the estimation amount is excessively large, a hue inverts at a portion from which the color blur is removed due to the excessively removal. According to the experiments of the instant inventors, an image of an excessive removal is likely to bring a sense of more unnaturalness than an image of a removal deficiency. In addition, when a color blur is left with a few removal deficiencies, the original brightness and color of the subject can be easily discerned.

The comparison limitation step of the first embodiment supplies the color blur estimation amount to the next process when the difference between the color blur estimation amount of the motion picture image frame (second frame image) B and the color blur removal amount used to process the stored motion picture image frame (first frame image) A falls within the predetermined range. When the color blur estimation amount exceeds the upper limit of the predetermined range, a sum of the upper limit value and the color blur removal amount used for the frame A is set to a color blur estimation amount for the next process. In addition, when the color blur estimation amount becomes less than the lower limit of the predetermined range, a sum of the lower limit value and the color blur estimation amount used for the frame A is set to a color blur estimation amount for the next step.

The comparison limitation step of the second embodiment supplies a pixel value after the color blur estimation amount is removed when the difference between a pixel value after the color blur estimation amount is removed from the motion picture image frame B and a pixel of the stored motion picture image frame A falls within the predetermined range. When the pixel value exceeds the upper limit of the predetermined range, a sum of the upper limit value and the pixel value of the motion picture image frame A is set for the next process as a pixel value of the motion picture image frame B after the color blur estimation amount is removed. In addition, when the pixel value becomes less than the lower limit of the predetermined range, a sum of the lower limit value and the pixel value of the motion picture image frame A is set for the next process as a pixel value of the motion picture image frame B after the color blur estimation amount is removed.

The above predetermined range may be changed based on the spatial operation result. At an area that is estimated to have a large brightness slope and a large color blur amount, the above predetermined range is changed based on the spatial operation result so as to remove (reduce) the color blur.

In addition, the spatial operation step may search for the high brightness subject in the image, and the estimation step may estimate the color blur amount based on a distance from the high brightness subject. In addition, the spatial operation step may search for the high brightness subject in the image, and the estimation step may calculate a blur image of the high brightness subject from a point spread function determined by the imaging optical system, thereby estimating a color blur amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298281, filed on Nov. 16, 2007, which is hereby incorporated by reference herein in its entirety.

What is claimed is:

1. An image processing apparatus configured to perform a process to reduce a color blur in a color motion picture image utilizing a first frame image and a second frame image that has been obtained after the first frame image, said image processing apparatus comprising:
   a memory configured to store a first color blur reduction amount used for the process to the first frame image;
   an estimator configured to calculate a color blur estimation amount in the second frame image through a spatial operation to the second frame image; and
   a determination part configured to calculate a second color blur reduction amount used for the process to the second frame image so that a difference between the first color blur reduction amount and the color blur estimation amount can fall within a predetermined range.

2. An image processing apparatus according to claim 1, wherein the determination part changes the predetermined range based on a result of the spatial operation.

3. An image processing apparatus configured to perform a process to reduce a color blur in a color motion picture image utilizing a first frame image and a second frame image that has been obtained after the first frame image, said image processing apparatus comprising:
   a memory configured to store a first pixel value used for the process to the first frame image;
   a first estimator configured to calculate a color blur estimation amount in the second frame image through a spatial operation to the second frame image;

a second estimator configured to calculate an estimation pixel value obtained through the process by using the color blur estimation amount to the second frame image; and a determination part configured to calculate a second pixel value output as a result of the process to the second frame image so that a difference between the first pixel value and the color blur estimation amount can fall within a predetermined range.

4. An image processing apparatus according to claim 3, wherein the determination part changes the predetermined range based on a result of the spatial operation.

5. An image processing method configured to perform a process to reduce a color blur in a color motion picture image utilizing a first frame image and a second frame image that has been obtained after the first frame image, said image processing method comprising the steps of:

storing a first color blur reduction amount used for the process to the first frame image;

calculating a color blur estimation amount in the second frame image through a spatial operation to the second frame image; and calculating a second color blur reduction amount used for the process to the second frame image so that a difference between the first color blur reduction amount and the color blur estimation amount can fall within a predetermined range.

6. An image processing method configured to perform a process to reduce a color blur in a color motion picture image utilizing a first frame image and a second frame image that has been obtained after the first frame image, said image processing method comprising the steps of:

storing a first pixel value used for the process to the first frame image;

calculating a color blur estimation amount in the second frame image through a spatial operation to the second frame image;

calculating an estimation pixel value obtained through the process by using the color blur estimation amount to the second frame image; and calculating a second pixel value output as a result of the process to the second frame image so that a difference between the first pixel value and the color blur estimation amount can fall within a predetermined range.

\* \* \* \* \*